Jan. 13, 1953        B. CHANCE        2,625,667

MULTIPLE TRACE OSCILLOSCOPE

Filed Oct. 29, 1945        2 SHEETS—SHEET 2

INVENTOR
BRITTON CHANCE

BY

ATTORNEY

Patented Jan. 13, 1953

2,625,667

UNITED STATES PATENT OFFICE 2,625,667

MULTIPLE TRACE OSCILLOSCOPE

Britton Chance, Cambridge, Mass., assignor, by mesne assignments, to the United States of America as represented by the Secretary of the Navy Application October 29, 1945, Serial No. 625,427

6 Claims. (Cl. 315—22)

This invention relates to cathode-ray oscilloscope circuits for the study of electrical phenomena which vary with time, or with some other parameter. It relates particularly to such circuits where it is desired to study the functional behavior of a plurality of such variables, or sets of variables, simultaneously.

It has previously been necessary when more than one set of variables was under study to use several oscilloscopes, or to use a switching system to present successive sets of data on the screen of one cathode-ray tube. Such schemes were necessarily cumbersome or complicated.

It is accordingly the object of this invention to provide an oscilloscope circuit whereby a plurality of sets of functional relationships between variables can be presented simultaneously on the screen of one cathode-ray tube.

It is also an object of this invention to provide an oscilloscope circuit whereby a plurality of variables can be simultaneously presented as functions of time on the screen of one cathode-ray tube.

It is further an object of this invention to provide an oscilloscope circuit whereby a plurality of different time bases are simultaneously available on the screen of one cathode-ray tube.

Figure 1:
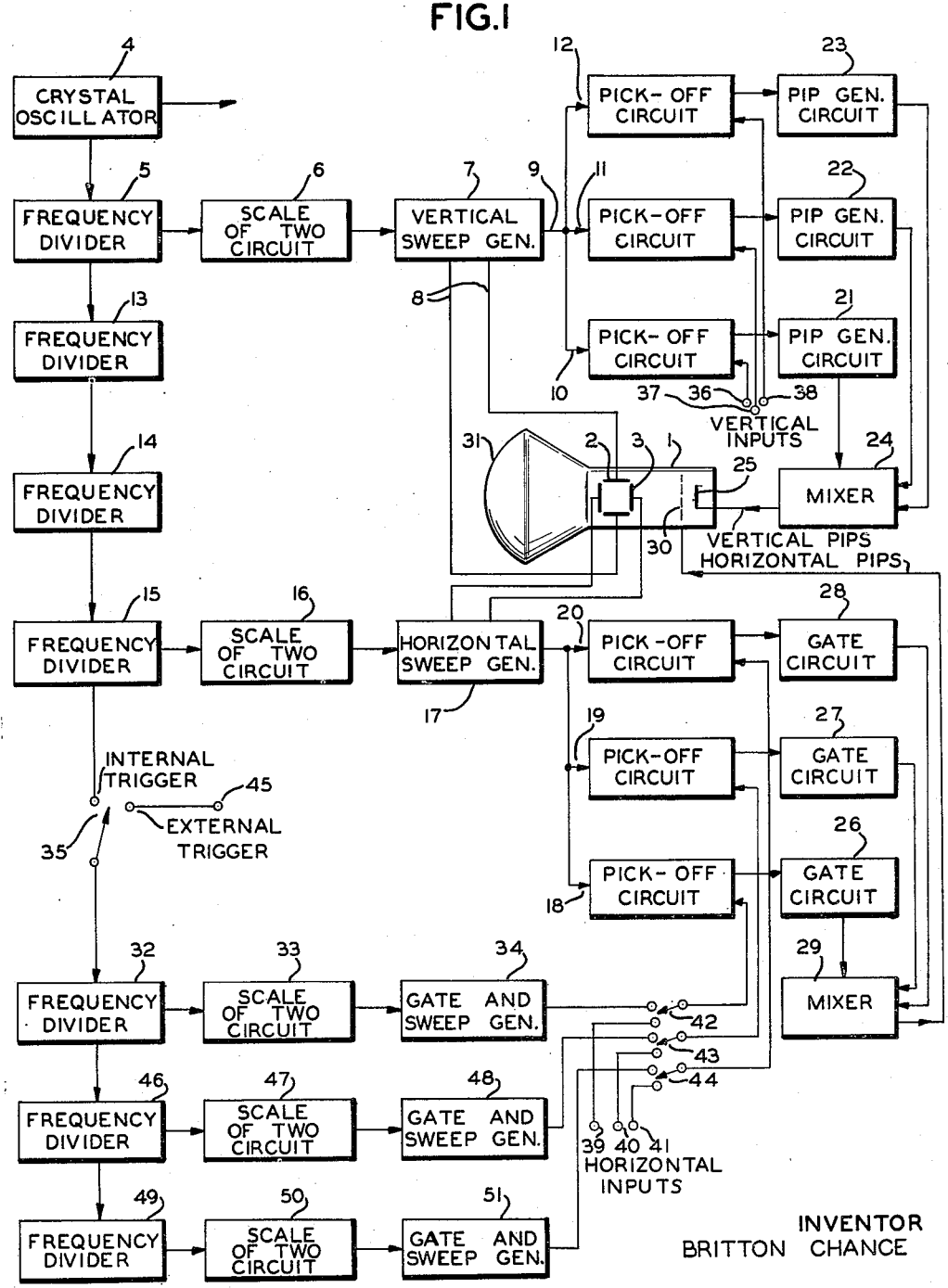
Figure 2:
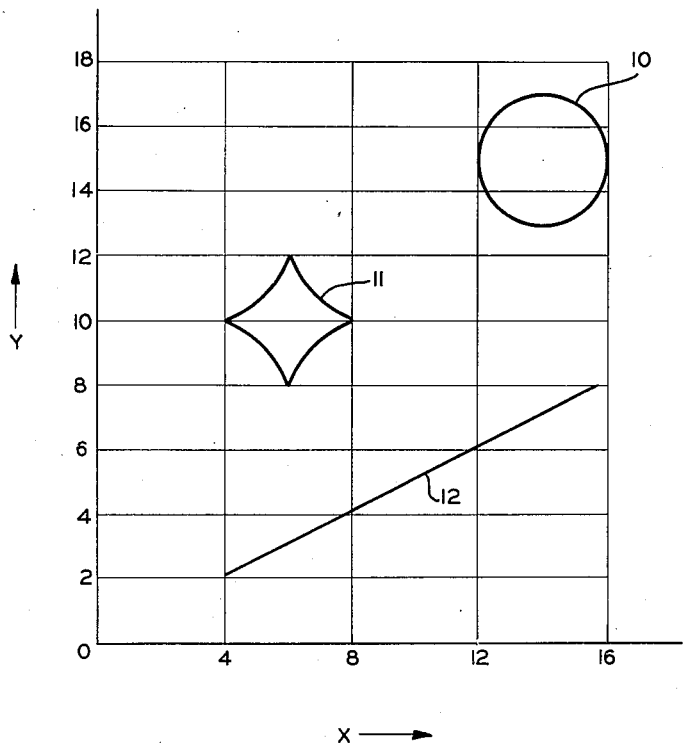

A better understanding of this invention will be made possible by reference to the drawing of which Fig. 1 is a block diagram of an embodiment of the invention, and Fig. 2 is an illustrative example of a possible data presentation.

In reference to Fig. 1 the cathode-ray tube 1 is provided with two sweeps, one of 20 microsecond duration and with a repetition rate of 25,000 times per second applied to the vertical deflection plates 2, and one of 0.01 second duration and a repetition rate of 50 times per second applied to the horizontal deflection plates 3. In Fig. 1 the deflection plates are shown rotated 90° from their actual position; that is they are drawn as if viewed through the screen of the cathode-ray tube. In this figure these two sweeps bear a definite time relationship to one another since they are both initiated by an oscillator 4, here crystal controlled. The output of the oscillator 4, at a frequency of say 100 kc.p.s. (kilocycles per second) is fed to a frequency divider circuit 5 with an output frequency of 50 kc.p.s. This 50 kc.p.s. frequency is fed in one channel to a scale of two circuit 6, for example an Eccles-Jordan circuit, which is triggered by every second cycle of the output of frequency divider 5. The output of this scale of two circuit is a voltage gate of 20 microseconds duration and a repetition rate of 25,000 times per second to vertical sweep generator 7, which sweep generator may take the form disclosed in copending application of Robert M. Walker, Serial No. 608,304, filed August 1, 1945. Vertical sweep generator 7 has two outputs 8 and 9, of which 8 is a precision push-pull sweep voltage of 20 microseconds duration and a 25,000 times per second repetition frequency fed to the vertical deflection plates 2 of cathode-ray tube 1. The other output 9 of the vertical sweep generator 7 is a sweep voltage of the same duration and repetition rate fed to three pick-off circuits 10, 11 and 12. These pick-off circuits 10, 11 and 12 may take the form of amplifier tubes with variable bias supplies; the grids capacitance coupled to output 9 of sweep generator 7, and the cathodes capacitance coupled to external signal terminals 36, 37 and 38, respectively. The tube in such a circuit will be brought into conduction when the sweep voltage from the sweep generator 7 has reached a value sufficient to overcome the bias voltage to which the bias supply has been adjusted.

The 50 kc.p.s. output of the frequency divider 5 is fed in a second channel to a series of frequency divider circuits 13, 14, and 15, resulting in an output from frequency divider 15 of a 100 cycles per second signal. This 100 cycles per second signal is fed to a scale of two circuit 16 which produces an enabling gate voltage for the horizontal sweep generator 17. This enabling gate has a time duration of 0.01 second and a repetition frequency of 50 times per second.

The horizontal sweep generator 17 produces a linear push pull sweep voltage to the horizontal deflection plates 3 of the cathode-ray tube 1 and a single sweep voltage to the pick-off circuits 18, 19, and 20 in a manner similar to that used for the vertical sweep.

In addition to the sweep inputs discussed above the pick-off circuits 10, 11, 12, 18, 19 and 20 each have one external signal input as mentioned. It has also been noted that three of these pick-off circuits 10, 11, and 12, and hence their external signal inputs 36, 37, 38 are associated with the vertical sweep circuit of the oscilloscope and that the remaining three pick-off circuits 18, 19, 20 with their external signal inputs 39, 40, 41 are associated with the horizontal sweep circuit of the oscilloscope.

It will be sufficient for the understanding of the invention to follow the external signals through one set of pick-off and intensification circuits. The variable bias supply of the pick-off circuit 10 is adjusted to some value of voltage chosen by the operator. In the absence of an external signal the tube will not conduct until the vertical sweep voltage from the sweep generator 7 has reached a value to overcome this bias. When the tube is brought into conduction it supplies a signal to the pip generator 21 which provides a voltage pip of short duration to the mixer 24 which applies this voltage pip as an intensification pulse to the cathode 25 of the cathode-ray tube 1. If an external signal is applied to the pick-off circuit 10 by means of terminal 36, the vertical sweep voltage necessary to cause the tube of pick-off circuit 10 to go into conduction will be varied about the static bias point, as established by the bias adjustment, in accordance with the applied signal. It will be seen that one intensification pulse will be supplied by pick-off circuit 10 to the cathode 25 of the cathode-ray tube 1 for each vertical sweep. At what point on any particular vertical sweep the intensification pulse will occur will be determined by the bias on the tube of pick-off circuit 10 and the instantaneous value of the signal applied to terminal 36.

In a like fashion the tube of pick-off circuit 20 is biased to a point chosen by the operator. With no external signal applied to terminal 41 tube 20 will not conduct current until the value of the horizontal sweep voltage is sufficient to overcome the chosen bias. When the tube is brought into conduction it supplies a signal to gate circuit 28 which provides a gate voltage of 35 microseconds duration. This gate is fed to the mixer 29, which in turn applies it as an intensification voltage pulse to the grid 30 of the cathode-ray tube 1. If an external signal is applied to the pick-off circuit 20 by means of terminal 41, the horizontal sweep voltage necessary to cause the pick-off tube 20 to go into conduction will vary about the static bias point, as established by the operator, in accordance with the applied signal. In this fashion pick-off circuit 20 will supply one intensification pulse of 35 microseconds duration to the grid 30 of the cathode-ray tube 1 for each horizontal sweep. The point on any horizontal sweep at which this intensification pulse will occur will be determined by the bias on pick-off tube 20, and the instantaneous value of the external signal applied to terminal 41.

The bias on cathode-ray tube 1 is adjusted so that no spot will appear on its screen 31 unless the intensification pulses applied to the cathode 25 and the grid 30 occur in coincidence. Such a coincidence of intensification pulses due to any pair of signal channels can occur only once for each horizontal sweep as the gate supplied by the horizontal signal channel has a time duration of 35 microseconds which is just short of the recurrence period of the vertical sweep. Since the vertical position on the screen 31 of the spot caused by the coincidence of intensification pulses described above is determined by the instantaneous value of the external signal applied to pick-off tube 10, and since the horizontal position of the spot on the screen 31 is determined by the instantaneous value of the external signal applied to pick-off tube 20, the position of the spot on the screen 31 is a function of the instantaneous values of both signals. In this fashion the succession of spots on the screen 31 due to the succession of coincidences of the intensification pulses from the vertical and horizontal signal channels will trace out on the screen 31 the functional relationships between the signals applied to pick-off circuits 10 and 20 respectively. The portion of the screen 31 on which this information will be presented will depend upon the bias which the operator chooses for the tube of circuit 10 and for the tube of circuit 20, and upon the amplitudes of the signals applied to terminals 36 and 41.

It can readily be seen that like analyses could be made for the remaining two pairs of signal channels shown on Fig. 1. Thus a total of three sets of functional relationships between two variables can be presented on screen 31 by the embodiment of the invention outlined by Fig. 1.

A further clarification of the above analysis may be had by reference to Fig. 2 which is an illustrative example of a possible presentation of three sets of data. To facilitate discussion of this presentation reference will also be made to Fig. 1. In Fig. 2 the rectangular set of horizontal and vertical lines with their associated numerals and coordinate indices, X and Y, would be on a transparent grid superimposed on screen 31. These lines are used to specify the vertical and horizontal position of a spot or pattern appearing on screen 31. The geometric figures 10, 11, 13 are traces on screen 31 due to signals applied to the external terminals 36, 37, 38, 39, 40, 41 as shown on Fig. 1. An analysis of the manner in which trace 10 is caused to appear on screen 31 will be made. In Fig. 1 assume that the tube of vertical pick-off circuit 10 is biased to such a value that the intensification pip or vertical marker due to pick-off circuit 10 would occur at 15 divisions from the bottom of the screen as shown in Fig. 2. Assume that at terminal 36 of Fig. 1 an external signal voltage of the form $V=k \sin 2\pi ft$ is applied. In this form V is the instantaneous value of the signal voltage, $k$ is a constant equal to the maximum amplitude of the signal voltage, $f$ is the frequency of the signal and $t$ is the time. Due to this applied signal the vertical marker would be caused to execute a motion $2 \sin 2\pi ft$, between the limits $Y=13$ and 17, the input circuit being so adjusted as to make the maximum amplitude of the motion equal to 2 divisions. Likewise assume that the tube of pick-off circuit 20 is biased to such a value that the intensification gate, or horizontal marker due to the channel would occur at 14 divisions on the X coordinate of Fig. 2. If a voltage function of the form $k \cos 2\pi ft$ is applied to terminal 41 on Fig. 1, the horizontal marker can be caused to execute a motion $2 \cos 2\pi ft$ between the limits $X=12$ and 16. Coincidence of intensification pulses due to these two signal channels can only occur in the broad region marked off by the square $X=12$ to 16 and $Y=13$ to 17. The actual coordinate ranges at which coincidences do occur are solutions of the parametric equations $Y=2 \sin 2\pi ft$ and $X=2 \cos 2\pi ft$, and the locus of points of coincidence is the circle $x^2+y^2=4$ as shown by trace 10 on Fig. 2.

Similar analyses could be made to show how traces 11 and 13 of Fig. 2 are caused to appear on the screen 31 by utilizing the other two sets of signal channels. Trace 11 is the result of applying to vertical input 37 a voltage signal of the form $V=k \sin^3 2\pi ft$ and to horizontal input 40 a signal of the form $V=k \cos^3 2\pi ft$. Trace 13 is the result of applying to vertical input 38 a signal $V=k_1 t$ and to the horizontal input 39 a signal $V=k_2 t$ where $k_1$ and $k_2$ are constants of different value. The patterns are prevented from interfering by biasing the tubes of the pick-off circuits to such values that the markers will have initial displacements which will provide clearance. For the sake of simplicity the voltage functions discussed here have been continuous. Discontinuous, or transient functions may be equally well presented.

If it is desired that a variable, or variables be studied as functions of time it will be necessary to introduce as the external signal to the horizontal pick-off circuit a voltage which is a linear function of time. The time base which is presented will depend upon the rate at which this voltage changes with respect to time. In the embodiment of the invention illustrated by Fig. 1 provisions have been made to supply three different time bases to the oscilloscope circuit. Again an analysis of one of these time base circuits will be sufficient. By closing switch 35 to internal trigger an output from the frequency divider 15 provides a 100 c. p. s. signal to the frequency divider 32. From frequency divider 32 a 20 c. p. s. signal is fed to the scale of two circuit 33 which provides a voltage gate of 0.1 second duration at a repetition rate of 5 per second to the sweep generator 34. The output of sweep generator 34 is a linear sweep voltage of 0.1 second duration. This sweep is fed to the signal input of a horizontal pick-off circuit by means of switch 42 causing the horizontal range at which the 35 microsecond intensifier pulse occurs to vary linearly with time sweeping across a segment of the screen in 0.01 second, such sweeps being repeated 5 times per second. The external signal which is applied to the corresponding terminal 36, 37 or 38 will be presented on the screen as a function of time. A like analysis could be made for each of the other two time base channels consisting of frequency divider circuit 46, scale of two circuit 47, sweep generator 48, and of frequency divider circuit 49, scale of two circuit 50, and sweep generator 51 respectively. In the embodiment of the invention shown in Fig. 1 these channels provide horizontal sweeps of 1 and 10 seconds time duration. The durations of the sweeps provided by the three time base channels can be altered by throwing switch 35 to external trigger position and applying at terminal 45 a signal of the desired frequency.

The embodiment of the invention shown in Fig. 1 may also be operated with a common horizontal time base for signals applied to the vertical signal channels. To accomplish this the bias on cathode-ray tube 1 is adjusted so that intensification pulses on cathode 25 alone will be sufficient to permit the electron beam to strike screen 31. Under these conditions each pick-off circuit 10, 11, 12 will cause a spot to appear on screen 31 for each vertical sweep. The vertical ranges of such spots will be determined by the values of bias on pick-off circuits 10, 11, 12 and the instantaneous values of the signals applied to terminals 36, 37, and 38. The succession of spots so caused to appear will trace out on screen 31 the variation with time of the signals applied to terminals 36, 37, and 38. The common horizontal time base will be the sweep provided by horizontal sweep generator 17. The patterns are again prevented from interfering by proper bias adjustments on pick-off circuits 10, 11, and 12.

Another embodiment of the invention could be constructed so as to present on the screen of one cathode-ray tube a plurality of functional relationships in polar coordinates. In this embodiment the vertical sweeps of Fig. 1 would be replaced by fast radial sweeps, and the horizontal sweeps of Fig. 1 would be replaced by circular sweeps. The pick-off circuits for the circular sweep channels could take the form of phasing condensers which would determine the points on the circular sweeps where the intensification gates to the grid of the cathode-ray tube would occur.

An added advantage of the oscilloscope circuits described above is that the effect of any non-linearity in the sweep generators will be minimized. Since the same sweep which is used to deflect the beam is applied to the pick-off circuit to determine the point at which an intensification pulse appears the effect of a non-linearity in the sweep will tend to be cancelled out.

The use of specific sweep speeds and repetition rates in the above description should not be understood as limiting the scope of the invention. Other combinations of sweep speeds and repetition rates can be used to meet varying conditions. The circuits indicated by the blocks in Fig. 1 are in common use and several forms of each will suggest themselves to those skilled in the art.

The invention is only to be limited by the scope of the appended claims.

I claim:

1. A multiple-trace oscilloscope circuit comprising an electrostatic cathode-ray tube, a master oscillator, a series of frequency divider circuits fed by said master oscillator and having a low frequency output and a high frequency output, a scale of two circuit producing a square wave output and fed by said high frequency output and triggered by each alternate cycle of said high frequency output, a vertical sweep voltage generator controlled by the square wave output of said scale of two circuit and supplying a linear sweep voltage to the vertical beam deflection plates of said cathode-ray tube, a set of three pick-off circuits with independently variable bias supplies, and each having as inputs the sweep voltage output of said vertical sweep generator and one external signal, separate pip generator circuits each fed by one of said pick-off circuits, a mixer circuit fed by the signals from said pip-generator circuits, and applying said signals as intensifier voltage pulses to the cathode of said cathode-ray tube, a scale of two circuit producing a square wave output and fed by said low frequency output of said series of frequency divider circuits and triggered by each alternate cycle of said low frequency output, a horizontal sweep voltage generator controlled by the square wave output of said scale of two circuit and supplying a linear sweep voltage to the horizontal beam deflection plates of said cathode-ray tube, a set of three pick-off circuits with independently variable bias supplies and each having as signal inputs the sweep voltage output of said horizontal sweep generator and one external signal, separate gate voltage generators each triggered by the outputs of one of said pick-off circuits, a mixer fed by the signals from said gate voltage generators and applying such signals as intensifier voltage pulses on the grid of said cathode-ray tube, a time coincidence of said intensifier pulses on said cathode and said grid of said cathode-ray tube causing a beam of electrons to strike the screen of said cathode-ray tube causing a spot of said screen to be illuminated.

2. The combination of claim 1 with a set of time-base generators each comprising a frequency divider circuit fed by said low frequency output of said series of frequency divider circuits, or an external signal, a scale of two circuit triggered by each alternate cycle of the output of said frequency divider circuit, a linear sweep voltage generator controlled by the output of said scale of two circuit, and means whereby the output of said sweep voltage generator can be applied as the external signal to said horizontal pick-off circuits, said set of time base generators supplying simultaneously three time bases of different duration for said oscilloscope circuit.

3. A multiple trace oscilloscope circuit comprising a cathode ray tube normally biased to cutoff, synchronized vertical and horizontal sweep voltage generators, means applying said sweep voltages to said tube, a plurality of independent signal input circuits for paired horizontal and vertical signal components, a plurality of independently biased circuits, each responsive to a sweep voltage and a signal voltage from one of said signal input circuits to produce one output voltage pulse for each sweep voltage excursion, and means for applying said output voltage pulses to intensify said cathode ray beam for time coincidence of paired input signals.

4. A multiple trace oscilloscope circuit comprising a cathode ray tube normally biased to cutoff, synchronized vertical and horizontal sweep voltage generators, means applying said sweep voltages to said tube, a plurality of independent horizontal and vertical signal input circuits for paired horizontal and vertical signal components, a plurality of independently biased circuits, each responsive to a sweep voltage and a signal voltage from one of said independent signal input circuits to produce one output voltage pulse for each sweep voltage excursion, means for applying said pulses to intensify said cathode ray beam at the time coincidence of paired vertical and horizontal input signals, and means to adjust the bias of said independently biased circuits to select the portion of the screen in which the trace of motion caused by a given pair of vertical and horizontal input signals appears.

5. A multiple trace oscilloscope circuit comprising a cathode ray tube normally biased to cutoff, synchronized vertical and horizontal sweep voltage generators, means applying said sweep voltages to said tube, a plurality of independent horizontal and vertical signal input circuits, a plurality of independently biased circuits, each responsive to a sweep voltage and a signal voltage input from one of said independent signal input circuits to produce one output voltage pulse for each sweep voltage excursion, and means for applying said output voltage pulses to intensify said cathode ray beam, whereby time coincidence of pulses from pairs of horizontal and vertical signal input circuits produces an intensified spot having a position dependent upon the bias of said independently biased circuits and the time voltage function of the pair of coincident input signals.

6. A multiple trace oscilloscope circuit having a cathode ray tube normally biased to suppress the cathode ray beam, means to generate synchronized horizontal and vertical sweep voltages adapted to cause said cathode ray beam to scan, a plurality of input signal voltage sources, a plurality of vertical signal input circuits, each responsive to the voltage amplitude of one of said input signals and to said vertical sweep voltage to generate an intensifying pulse for each vertical sweep voltage excursion, a plurality of horizontal signal input circuits, each responsive to the voltage amplitude of one of said signal inputs and said horizontal sweep voltage to generate an intensifying pulse for each horizontal sweep voltage excursion, and means applying said intensifying voltage pulses to said cathode ray tube to produce a beam spot at time coincidence of vertical and horizontal intensifying pulses.

BRITTON CHANCE.

REFERENCES CITED

The following references are of record in the file of this patent:

UNITED STATES PATENTS

| Number | Name | Date |
| --- | --- | --- |
| Re. 22,672 | Shumard | Aug. 28, 1945 |
| 2,121,359 | Luck et al. | June 21, 1938 |
| 2,292,045 | Burnett | Aug. 4, 1942 |
| 2,366,357 | Schlesinger | Jan. 2, 1945 |
| 2,405,231 | Newhouse | Aug. 6, 1946 |
| 2,405,238 | Seeley | Aug. 6, 1946 |
| 2,406,970 | Smith | Sept. 3, 1946 |
| 2,512,923 | Dippy | June 27, 1950 |